(12) United States Patent
Belchior et al.

(10) Patent No.: US 12,290,793 B2
(45) Date of Patent: May 6, 2025

(54) PROCESS FOR PRODUCING A HIGHLY POROUS CaO-BASED MATERIAL MODIFIED WITH CARBON NANOTUBES FOR CAPTURING VEHICLE $CO_2$ PRODUCT AND USE

(71) Applicants: PETROLEO BRASILEIRO S.A.—PETROBRAS, Rio de Janeiro (BR); UNIVERSIDADE FEDERAL DE MINAS GERAIS, Belo Horizonte (BR); FUNDACAO DE AMPARO A PESQUISA DO ESTADO DE MINAS GERAIS—FAPEMIG, Belo Horizonte (BR); FCA FIAT CHRYSLER AUTOMOVEIS BRASIL LTDA, Betim (BR)

(72) Inventors: Jadson Claudio Belchior, Belo Horizonte (BR); Luiz Carlos Alves De Oliveira, Belo Horizonte (BR); Henrique Dos Santos Oliveira, Belo Horizonte (BR); Laura Maia De Araujo, Contagem (BR); Pedro Caffaro Vicentini, Rio de Janeiro (BR); Luciana Neves Loureiro, Rio de Janeiro (BR)

(73) Assignees: PETROLEO BRASILEIRO S.A.—PETROBRAS, Rio de Janeiro (BR); UNIVERSIDADE FEDERAL DE MINAS GERAIS, Belo Horizonte (BR); FUNDACAO DE AMPARO A PESQUISA DO ESTADO DE MINAS GERAIS—FAPEMIG, Belo Horizonte (BR); FCA FIAT CHRYSLER AUTOMOVEIS BRASIL LTDA, Betim (BR)

( * ) Notice: Subject to any disclaimer, the term of this patent is extended or adjusted under 35 U.S.C. 154(b) by 986 days.

(21) Appl. No.: 17/415,168

(22) PCT Filed: Dec. 19, 2019

(86) PCT No.: PCT/BR2019/050554
§ 371 (c)(1),
(2) Date: Nov. 24, 2021

(87) PCT Pub. No.: WO2020/124189
PCT Pub. Date: Jun. 25, 2020

(65) Prior Publication Data
US 2022/0080380 A1 Mar. 17, 2022

(30) Foreign Application Priority Data
Dec. 20, 2018 (BR) .......................... 102018076792-5

(51) Int. Cl.
*B01J 20/30* (2006.01)
*B01D 53/62* (2006.01)
(Continued)

(52) U.S. Cl.
CPC ............ *B01J 20/041* (2013.01); *B01D 53/62* (2013.01); *B01D 53/82* (2013.01); *B01D 53/92* (2013.01);
(Continued)

(58) Field of Classification Search
None
See application file for complete search history.

(56) References Cited

FOREIGN PATENT DOCUMENTS

BR    102013019137 A2    8/2015

OTHER PUBLICATIONS

Wu et al., "Inexpensive calcium-modified potassium carbonate sorbent for CO2 capture from flue gas: improve SO2 resistance, enhanced capacity and stability," Fuel 125: 50-56 (2014).
(Continued)

*Primary Examiner* — Daniel Berns
(74) *Attorney, Agent, or Firm* — RAPHAEL BELLUM PLLC

(57) ABSTRACT

The invention refers to the process of obtaining porous spheres based on CaO modified with carbon nanotubes for the capture of $CO_2$. The invention also refers to the spheres obtained and their use to capture $CO_2$ generated by a vehicular internal combustion engine, aiming to reduce the amount of $CO_2$ released into the atmosphere.

11 Claims, 3 Drawing Sheets

(51) Int. Cl.
*B01D 53/82* (2006.01)
*B01D 53/92* (2006.01)
*B01J 20/04* (2006.01)
*B01J 20/20* (2006.01)
*B01J 20/28* (2006.01)

(52) U.S. Cl.
CPC ....... *B01J 20/205* (2013.01); *B01J 20/28004* (2013.01); *B01J 20/28019* (2013.01); *B01J 20/305* (2013.01); *B01J 20/3078* (2013.01); *B01D 2251/404* (2013.01); *B01D 2251/602* (2013.01); *B01D 2257/504* (2013.01); *B01D 2259/4566* (2013.01); *B01J 2220/42* (2013.01)

(56) References Cited

OTHER PUBLICATIONS

Salvador et al., "Enhancement of CaO for CO2 capture in an FBC environment," Chemical Engineering Journal, 96: 187-195 (2003).
Lu et al., "Comparative study of CO2 capture by carbon nanotubes, activated carbons, and zeolites," Energy & Fuels, 22: 3050-3056 (2008).
Osler et al., "Synthesis and evaluation of carbon nanotubes composite adsorbent for CO2 capture: a comparative study of CO2 adsorption capacity of single-walled and multi-walled carbon nanotubes," International Journal of Coal Science & Technology 4(1): 41-49 (2017).
International Search Report in International Application PCT/BR2019/050554, dated Feb. 3, 2020.

PROCESS FOR PRODUCING A HIGHLY POROUS CaO-BASED MATERIAL MODIFIED WITH CARBON NANOTUBES FOR CAPTURING VEHICLE CO$_2$ PRODUCT AND USE

The invention refers to the process of obtaining CaO-based material, modified with carbon nanotubes for the capture of CO$_2$. The invention also refers to the product obtained, which consists of the CaO-material, preferably in the form of porous spheres, which capture CO$_2$ and, therefore, can be used to capture the CO$_2$ generated by a vehicular internal combustion engine, aiming to reduce the amount of CO$_2$ released into the atmosphere.

The Intergovernmental Panel on Climate Change (IPCC) has encouraged the adoption of a technology called carbon capture and storage (CCS) as a way to reduce CO$_2$ emissions. The CCS is composed of three steps (i) separation of mixtures of gases of CO$_2$ (capture of CO$_2$); (ii) compression and transportation of CO$_2$ and (iii) storage of CO$_2$. The step of capturing CO$_2$ is the most costly, corresponding to approximately 75% the total cost of the CCS. Thus, in order to make CCS procedures economically viable, several researches have been carried out to improve the efficiency of capture of CO$_2$ (J. Rogelj, M. Meinshausen, R. Knutti, *Global warming under old and new scenarios using IPCC climate sensitivity range estimates. Nature Climate Change*, v. 2, p. 248-253, 2012).

The process known as "calcium loop" was characterized by carbonation cycles, CO$_2$ absorption, and calcination of CaO-based absorbent, CO$_2$ release and absorbent regeneration, based on the reversible reaction between CaO and CO$_2$ (Equations 1 and 2):

$$CaO + CO_2 \rightarrow CaCO_3 \quad (1)$$

$$CaCO_3 \rightarrow CaO + CO_2 \quad (2)$$

Calcium oxide based materials are low cost and can absorb large amounts of CO$_2$ in the temperature range between 300-700° C., about 0.79 g CO$_2$ per 1.00 g CaO (Y. Li, X Ma, W. Wang, C. Chi, J. Shi, L. Duan, *Enhanced CO$_2$ capture capacity of limestone by discontinuous addition of hydrogen chloride in carbonation at calcium looping conditions, Chemical Engineering Journal*, v. 316, p. 438-448, 2017; J. Feng, H. Guo, S. Wang, Y. Zhao, X Ma, *Fabrication of multi-shelled hollow Mg-modified CaCO3 microspheres and their improved CO2 adsorption performance, Chemical Engineering Journal*, v. 321, p. 401-411, 2017; Scott Champagne, Dennis Y. Lu, Robert T. Symonds, Arturo Macchi, E. J. Anthony, *The effect of steam addition to the calciner in a calcium looping pilot plant, Powder Technology*, v. 290, p. 114-123, 2016).

The use of calcium oxide-based materials presents a limitation related to the loss of CO$_2$ capture capacity as the number of carbonation and regeneration cycles increases. Studies report that CO$_2$ capture decreases about 0.1 g of CO$_2$ per each 1 g of CaO after 20 consecutive cycles (C. Luo, Y. Zheng, C. G. Zheng, J. J. Yin, C. L. Qin B. Feng, *Manufacture of calcium-based sorbents for high temperature cyclic CO2 capture via a sol-gel process, International Journal of Greenhouse Gas Control*, v. 12, p. 193-199, 2013). This is due to sintering, a consequence of the partial obstruction of the pores, which is reflected in reduced gas capture efficiency. Therefore, several studies sought to add CaO-based inert materials with high melting points in the absorbent composition, in order to improve structural and thermal stability, especially during regeneration cycles.

Among these materials, Al$_2$O$_3$, CaZrO$_3$, TiO$_2$, Na$_2$O, K$_2$O and MgO being of greater interest the MgO, due to the relationship between physicochemical properties, availability and low cost thereof (Z. Skoufa, A. Antzara, E. Heracleous, A. A. Lemonidou, *Evaluating the activity and stability of CaO-based sorbents for postcombustion CO$_2$ capture in fixed-bed reactor experiments, Energy Procedia*, v. 86, p. 171-180, 2016; I. Sreedhar, T. Nahar, A. Venugopal, B. Srinivas, *Carbon capture by absorption—Path covered and ahead, Renewable Sustainable Energy Reviews*, v. 76, p. 1080-1107, 2017; X Xie, Y. J. Lie, C. T. Liu, W. J. Wang, *HCl absorption by CaO/Ca3Al2O6 sorbent from CO$_2$ capture cycles using calcium looping, Fuel Processing Technology*, v. 138, p. 500-508, 2015).

The addition of magnesium oxide to calcium oxide promotes an increase in the surface area through the formation of mesopores and reduces the sintering rate of the absorbent, prolonging the useful life of the material, as the basic MgO chemosorption sites improve and promote activation of CO$_2$ capture (WO 2010102371).

A field of research that has been growing very fast is the development, design and characterization of inorganic nanostructures based on hybrid carbon, generally comprised of metal oxides and NTC (S. Mallakpour, E. Khadem, *Carbon nanotube-metal oxide nanocomposites: Fabrication, properties and applications, Chemical Engineering Journal*, v. 302, p. 344-367, 2016). Carbon nanotubes are generally used as support for metals, carriers of substances and structural property modifiers of materials (B. Krause, R. Boldt, P. Pötschke, *A method for determination of length distributions of multiwalled carbon nanotubes before and after melt processing, Carbon*, v. 49, p. 1243-1247, 2011).

The mechanical properties of carbon nanotubes (NTCs) are generally reported to have an average modulus of elasticity, electrical and thermal conductivity. Also being used as a gas sensor and several other applications that can be provided by the beneficial effect of NTCs (E. Neubauer, M. Kitzmantel, M. Hulman, P. Angerer, *Potential and challenges of metal-matrix-composites reinforced with carbon nanofibers and carbon nanotubes, Composites Science and Technology*, v. 70, p. 2228-2236, 2010; M. M. Rana, D. S. Ibrahim, M. R. M. Asyraf, S. Jarin, A. Tomal, *A review on recent advances of CNTs as gas sensors, Sensor Review*, v. 37, p. 127-136, 2017; E. C. O. Nassor, J. C. Tristão, H. S. Oliveira, F. C. C. Moura, E. N. dos Santos, R. M. Lago, M. H. Araujo, *Magnetic Carbon Nanofiber Networks as Support for Ionic Liquid Based Catalyst, Catalysis Letters*, v. 145, p. 505-510, 2015). Several documents are found in the prior art regarding the development of chemical methods of synthesis and preparation of adsorbents for CO$_2$ capture, mainly focused on the development of adsorbents with increased specific area and also nanostructured materials.

Among the most efficient processes for capturing exhaust gases from gasoline engines (Otto cycle) are chemical adsorption technologies. Several studies have reported the importance of capture (U.S. Pat. No. 8,192,531 B2, EP 2792399 A1 and CA 2858803A1) and regeneration of adsorption systems (US 20130315809 A1). For example, the development and application of technologies for different exhaust gas temperatures in vehicle engines showed NOx adsorption efficiency between 200-400° C. with Pt/BaO/Al$_2$O$_3$ (L. Liu, Z. Li, S. Liu, B. Shen, *Effect of exhaust gases of Exhaust Gas Recirculation (EGR) coupling lean-burn gasoline engine on NOx purification of Lean NOx trap (LNT) Mechanical System Signal Process*, v. 87, p. 195-213, 2017).

The most widely adopted commercial method industrially in the processing of natural gas and hydrogen uses aqueous solutions of amines: monoethanolamine and methyldiethanolamine (U.S. Pat. No. 6,881,389 B2). The amine solution has shown high $CO_2$ capture efficiency, as shown in U.S. Pat. No. 9,028,785 B2 which claims $CO_2$ capture using a 1:2.2 of 2-etoxiethylamina/tetramethylguanidine. In this procedure approximately 29% of the ethoxyethylamines were monocarboxylated, while 71 mol % were dicarboxylated (total $CO_2$ load by ethoxyethylamine 171%, total $CO_2$ load by guanidine 78%) in an absorption column.

It is also reported in the prior art the use of alkaline aqueous solutions of potassium carbonate, sodium hydroxide, ionic liquids and amines, for better efficiency in $CO_2$ capture process. However it is observed that a mixture of the basic solution containing amines reduces the vapor pressure in the absorption system and reduces the loss of active constituents by volatilization (Patents: U.S. Pat. No. 7,527,775 B2, WO 2016064918 A1, U.S. Pat. No. 9,486,733 B2). However, $CO_2$ capture technologies using aqueous alkaline solutions are highly corrosive and can also make it difficult for gas to pass through the exhaust system, resulting in potential damage to the operation of vehicular combustion engines.

The large-scale application of carbon dioxide absorption processes can be demonstrated by U.S. Pat. No. 5,087,597 (Orlando, L. et al.; *Carbon dioxide adsorbent and method for producing the adsorbent*, 1992) with the description of a mixture based on of polyalkoxysilane, silica, alumina and iron oxide, which is used in the absorption of $CO_2$ present in containers for transporting materials susceptible to decomposition in an acidic environment or for transporting animals.

Patent document RU2015122375 (A) of 2017 entitled "Method of producing chemical carbon dioxide absorb" refers to the production of chemical carbon dioxide absorber, used in individual breathing apparatus. The method of producing a carbon dioxide chemical absorbent consists of preparing a suspension of alkali and/or alkaline earth metal hydroxides dissolving water from alkali metal hydroxides with subsequent addition of alkali metal and/or alkaline earth hydroxides.

The patent document US20030232722(A1), 2002, entitled "Carbon dioxide gas absorbent, method for manufacturing the carbon dioxide gas absorbent and method of regenerating the carbon dioxide gas absorbent", describes a technology that provides the absorption of carbon dioxide gas through a material containing at least one compound selected from the group of sodium, potassium and lithium silicates.

The CaO-based material has potential for application in $CO_2$ capture in Otto cycle combustion engines, in the shape of spheres with a size in the range of 6-8 mm in diameter to be allocated in the exhaust system of the combustion gases (PI 0903159-6 A2). However, the use of materials containing calcium oxides does not achieve maximum efficiency due to the formation of $CaCO_3$ on the surface of the adsorbent, promoting the passivation of the material and consequent inactivation of the internal portion of the adsorbent particle (G. Montes-Hernandez, R. Chiriac, F. Toche, F. Renard, *Gas-solid carbonation of $Ca(OH)_2$ and CaO particles under non-isothermal and isothermal conditions by using a thermogravimetric analyzer: Implications for $CO_2$ capture*, International Journal of Greenhouse Gas Control, v. 11, p. 172-180, 2012).

The present invention reports the use of a calcium oxide-based material modified with carbon nanotubes, with $CO_2$ capture activity. Carbon nanotubes have a nanostructured topology, in the shape of a hollow cylinder, which gives the material distinct physicochemical properties. This allows a wide technological field of application in materials science. Their electronic properties are also known, as they have sp2 hybridized carbons in their structure, which allows good charge transfer in their structure (S. Li, Y. Feng, Y. Li, W. Feng, K. Yoshino, *Transparent and flexible films of horizontally aligned carbon nanotube/polyimide composites with highly anisotropic mechanical, thermal, and electrical properties*, Carbon, v. 109, p. 131-140, 2016).

Carbon nanotubes, in low concentrations, prevent the surface passivation of calcium oxide by the formation of carbonates. The present invention, therefore, is characterized by the addition of carbon nanotube in low concentration and the thermal treatment for its removal and the generation of pores. The inclusion of carbon nanotubes and their subsequent removal via thermal treatment allows the adsorbent to be created in the order of macropores (>50 nm), capable of significantly improving the diffusion of $CO_2$ providing greater contact with the calcium of the adsorbent material. Obtaining a material capable of capturing $CO_2$ in the form of hemispherical pellets allows its use in a device to be used in the exhaust of gases from the automobile, allowing its use on an industrial scale. Thus, the material presented in this invention can significantly contribute to reduce the emission of carbon dioxide into the atmosphere. These materials can also be obtained with MgO and other carbon materials such as activated carbon and graphene.

DETAILED DESCRIPTION OF THE TECHNOLOGY

Figure 1:
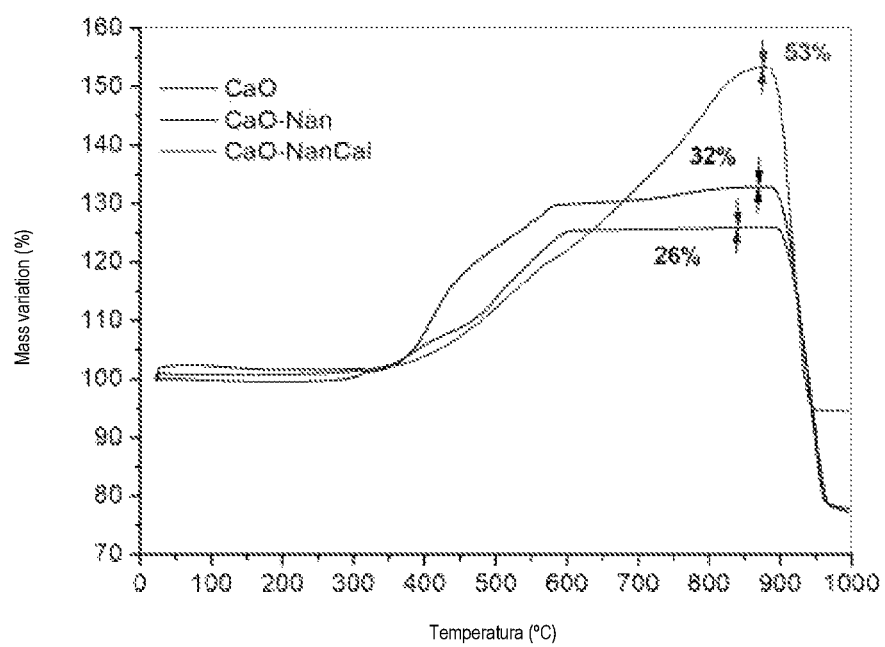
FIG. 1 graphically shows the ability of materials capturing $CO_2$ before and after modification with carbon nanotube.

The invention refers to the process of obtaining CaO-based material, modified with carbon nanotubes for the capture of $CO_2$. The invention also refers to the product obtained, which consists of the CaO-material, preferably in the form of porous spheres, which capture $CO_2$ and, therefore, can be used to capture the $CO_2$ generated by a vehicular internal combustion engine, aiming to reduce the amount of $CO_2$ released into the atmosphere.

The process for obtaining porous spheres based on CaO modified with carbon nanotubes of the present invention comprises the following steps:
  a. Solubilizing between 0.005 and 0.05 g, preferably 0.005 g of carbon nanotubes with 20.0 to 200.0 mL of distilled water, preferably 20.0 mL;
  b. Stirring for 15 to 20 minutes, preferably 20 minutes;
  c. Adding to the solution obtained in step "b", 10.00 to 50.00 g of calcium oxide;
  d. Shaking for 10 to 15 minutes, preferably 15 minutes;
  e. Transferring the compound obtained in step "d" to the ultrasound bath for 25 to 30 minutes, preferably 30 minutes;

f. Transferring the compound obtained in step "e" to silicone molds containing hemispherical cavities from 6 to 8 mm in diameter, preferably 8 mm in diameter;
g. Transferring the material obtained in "f" to an oven at a temperature of 60 to 80° C., preferably 80° C., for a time of 9 to 12, preferably 12 hours to dry the material;
h. Demolding the hemispherical granules obtained in step "g" and heating in an air atmosphere in a temperature range of 400 to 500, preferably 500° C., for a period of time of 20 to 30 minutes, preferably 30 minutes, then heating up to 700 to 800° C., preferably 800° C., for 20 to 30 minutes, preferably 30 minutes, thus removing the carbon nanotubes;
i. Cooling the material obtained in step "h" to room temperature.

The CaO-based material obtained contains carbon nanotubes in small amounts, from 0.05 to 0.1%, preferably 0.05% by mass.

The CaO-based carbon nanotube material of the present invention can employ CaO or MgO formulations through physical mixing or chemical incorporation with carbon materials such as carbon nanotube, carbon, activated carbon or graphene. The material based on CaO with carbon nanotubes, can also be presented in the form of spheres or semi-spheres.

The material defined above captures $CO_2$. Thus, it can be used coupled to car exhausts to capture vehicle $CO_2$.

The present invention is best understood in accordance with the examples described below.

Example 1—Preparation of Modified Cao with Carbon Nanotube

To prepare the adsorbent, 0.005 g of carbon nanotubes (Sigma-Aldrich), 10.00 g of calcium oxide (Neon) and 20.0 mL of distilled water were used. The carbon nanotubes were quantitatively dispersed in distilled water in an ultrasound bath for 20 min, then the solution containing carbon nanotubes was poured over the 10.00 g of calcium oxide. The addition of distilled water over the solid resulted in the formation of a pasty material. The pasty material was manually mixed with the aid of a glass rod for 15 min and then transferred to an ultrasound bath and left under stirring for 30 min. The pasty material was transferred to silicone molds containing 8 mm hemispherical cavities. The mold containing pasty material was left in an oven at 80° C. for 12 hours for drying.

Then the material was demolded and hemispherical granules of approximately 8 mm in diameter were obtained. The removal of carbon nanotubes was done by thermal treatment in an air atmosphere with two heating ramps: both with a heating rate of 20° C./min, the first at a temperature of 500° C. for 30 min; in the second heating step the temperature was increased to 800° C. and remained for another 30 min, after which the material was cooled to room temperature, the material was named CaO-NanCal. This procedure was necessary to completely remove the carbon nanotube and release the pores where the $CO_2$ will be chemically adsorbed.

Two other materials were tested, a commercial calcium oxide (Neon) named CaO, and calcium oxide with carbon nanotubes in the structure, named CaO-Nan. The form of preparation of CaO-Nan was identical to the CaO-Nan Cal adsorbent, except for the heat treatment step so that the material remained with the nanotube in its structure.

The $CO_2$ capture process by the developed adsorbents occurs physically and/or chemically through the surface of the adsorbent at a pressure of 1 atm. Calcium oxide-based adsorbents have capture activity at temperature in the range between 300-1000° C., which allows greater possibility of study with relative efficiency as a function of temperature.

Example 2—Capture Tests of $Co_2$

Thermogravimetric analyzes of materials before and after carbon nanotube modification (CaO, CaO-Nan and CaO-NanCal) were performed on a Netzsch STA 449 F3 Jupiter TGA analyzer to perform $CO_2$ capture performance studies.

The thermal analyzes were carried out in a $CO_2$ atmosphere, and the experiments carried out under this atmosphere elucidate the ability of these substances to capture $CO_2$ as a function of temperature. About 10 mg of sample was added to a standard alumina crucible and subjected to a temperature variation between 25 and 1,000° C. at a heating rate of 20° C. $min^{-1}$.

The results analyzed by TG (FIG. 2) showed that the material without modification with carbon nanotube (CaO) had a capture capacity of $CO_2$ of 32%, with saturation of that capacity after 600° C. After modification with nanotube, but without calcination of the material (CaO-Nan), there is a slight decrease in $CO_2$ capture capacity. The presence of nanotube seems to hinder the formation of carbonate, formed from the interaction of $CO_2$ with calcium in the adsorbent material. However, with the calcination of the material, such as to remove the carbon nanotube, a material with a $CO_2$ capture capacity of 53% is obtained. This material probably shows a more suitable porous structure for the reaction with $CO_2$ once the thermal removal of the nanotube promotes the formation of larger channels in the structure of adsorbent material.

Figure 2A:
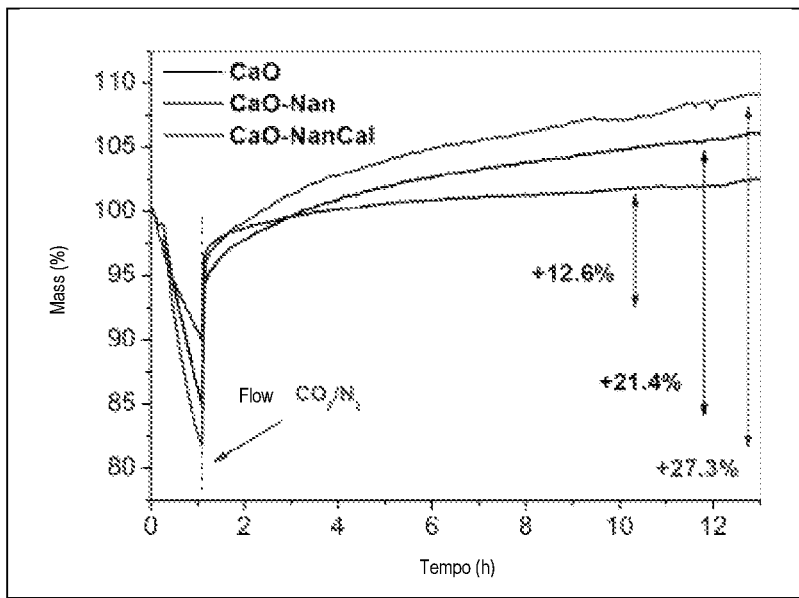
FIGS. 2A-2B graphically show $CO_2$ adsorption isotherm under $CO_2/N_2$ atmosphere at 350° C. for 12 h (FIG. 2A). Carbonation at 350° C. and regeneration at 900° C. of the CaO-NanCal adsorbent in five performance cycles (FIG. 2B).
Figure 2B:
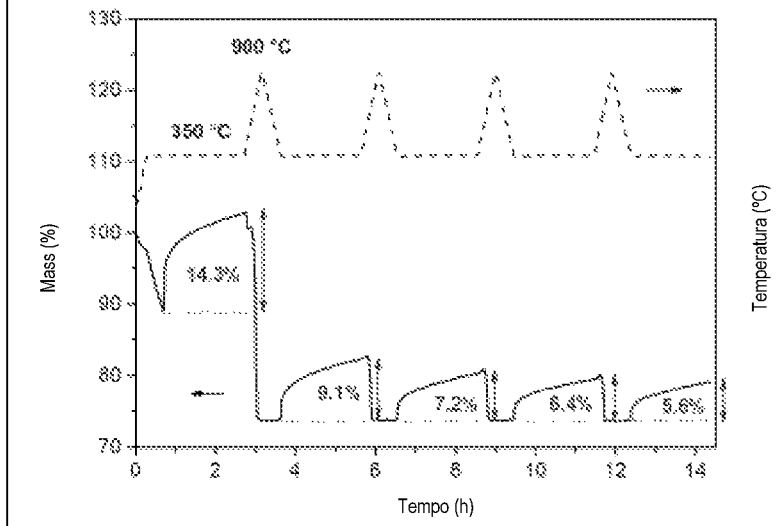

This differential in porosity due to generation of channels in the structure not only improved the $CO_2$ capture capacity, but also allowed the process to occur continuously, without saturating this capacity up to the maximum temperature studied. This result makes the material produced in the present invention with good capacity for use on a commercial scale, since the ability to capture $CO_2$ can be maintained for longer in case of use in a vehicular system. FIG. 2 also presents a schematic drawing of this channel generation process in the CaO-NanCal structure.

Example 3—Capture of $Co_2$—Isothermal Studies at 350° C. and Reuse of Adsorbent Material Aiming at application in automobiles, an isothermal study was carried out at a temperature of 350° C. This temperature was chosen since it is the starting temperature of the material's reaction with $CO_2$, as shown in FIG. 2. Furthermore, this temperature can be obtained in automobile exhausts, which would allow the generation of a kit of balls to be coupled to an automobile.

Figure 3:
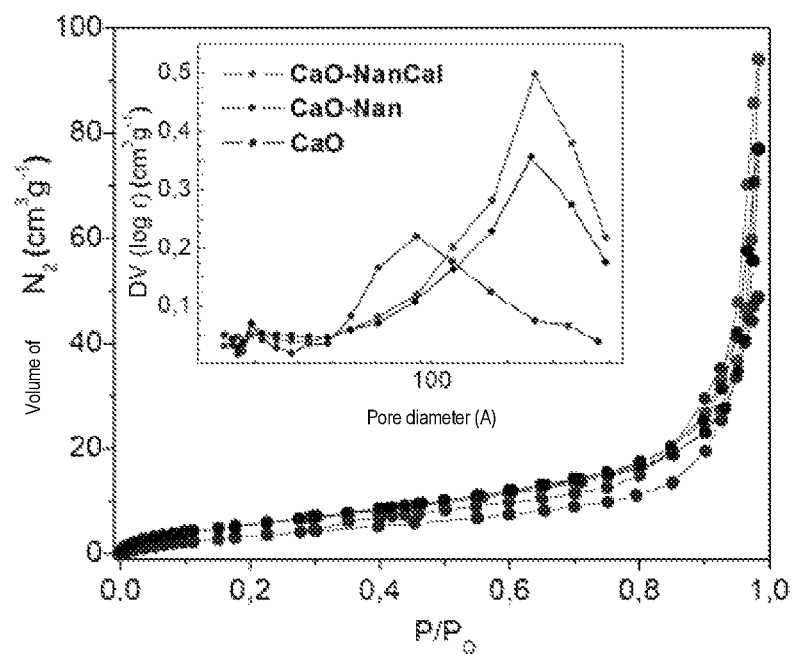
FIG. 3 graphically shows adsorption/desorption isotherms of $N_2$ at 196° C. and pore size distribution of the materials.

Initially, samples were heated from room temperature to 350° C. at a rate of 20° C. $min^{-1}$ in a pure flow of $N_2$ of 70 mL $min^{-1}$ and kept at 350° C. for 60 minutes to remove impurities. The flow of $N_2$ was then changed to a mixture of flow of $CO_2/N_2$, while the sample weight change was instantly monitored for 12 hours (FIG. 3a).

The results again indicate that the material that was modified with carbon nanotube and after calcination to generate the porous channels had a greater capacity to capture $CO_2$. The capture capacity was 27.3% at the temperature studied. Another point to consider is that the capture curve continues to ascend afterwards, indicating that the material has not lost its ability to react with $CO_2$. These results indicate that the material produced in this invention is very promising for use as a component of a kit to be adapted to car exhausts to reduce the emission of carbon dioxide into the atmosphere. For the most efficient material, a reuse study was carried out in order to study its limit recovery capacity.

A series of experiments were carried out, using the material CaO-NanCal in carbonation/decarbonation cycles. Initially, the sample was heated to 350° C. under flow of $N_2$ and then the gas flow was changed to a mixture of $CO_2/N_2$. The sample remained under the saturated atmosphere of $CO_2$ for 2 hours, after this step the flow of $CO_2$ was changed and the sample was heated to 900° C. under flow of $N_2$ for sample regeneration. The steps took place in five carbonation/decarbonation cycles (FIG. 3B). The results indicate that the material has a regenerative capacity, maintaining, after reaction cycles, a removal of 5.6%. These results indicate that the material can be reused, so that after its saturation it can be recovered after heat treatment.

Example 4—Characterization of Porosity of Materials

The materials were characterized by nitrogen adsorption at −196° C. in an AUTOSORB IQ2-Quantachrome system (FIG. 4). Surface area was calculated using the BET model; The total pore volume was estimated from the amount of nitrogen adsorbed at P/Po=0.95; The pore size distribution was determined based on the density functional theory (DFT). The $N_2$ adsorption/desorption isotherms show that the materials show similar $N_2$ adsorption capacity indicating that the materials show similar specific areas. However, the pore distribution shows that the most promising material, the one treated with carbon nanotube and calcined, has greater adsorption in larger pore diameters, above 100 Å. This corroborates previous discussions that indicated that this material had its porous structure developed with the modification with the carbon nanotube.

The invention claimed is:

1. A process for obtaining a CaO-based material or a MgO-based material comprising the following steps:
    a) Solubilizing between 0.005 and 0.05 g of a carbon material with 20.0 mL to 200.0 mL of distilled water;
    b) Stirring for 15 to 20 minutes;
    c) Adding to the solution obtained in step "b", 10.00 to 50.00 g of calcium oxide or magnesium oxide;
    d) Shaking for 10 to 15 minutes;
    e) Transferring the compound obtained in step "d" to an ultrasound bath for 25 to 30 minutes;
    f) Transferring the compound obtained in step "e" to silicone molds containing hemispherical cavities from 6 to 8 mm in diameter;
    g) Transferring the material obtained in "f" to an oven at a temperature of 60 to 80° C. for a time of 9 to 12 h to dry the material and to obtain hemispherical granules;
    h) Demolding the hemispherical granules obtained in step "g" and heating in an air atmosphere in a temperature range of 400 to 500° C. for a period of time of 20 to 30 minutes then heating up to 700 to 800° C. for 20 to 30 minutes, thus removing the carbon material;
    i) Cooling the material obtained in step "h" to room temperature.

2. The process of claim 1, wherein the carbon material is carbon nanotubes, carbon, activated carbon, or graphene.

3. The process of claim 2, wherein the carbon material is carbon nanotubes.

4. The process of claim 3, wherein the CaO-based material or the MgO-based material contains 0.05 to 0.1% carbon nanotubes by mass.

5. The process of claim 4, wherein the CaO-based material or the MgO-based material contains 0.05% carbon nanotubes by mass.

6. The process of claim 1, wherein the addition of step "c" occurs by physical mixture or chemical incorporation.

7. The process of claim 1, wherein:
    in step "a", the amount of the carbon material used is 0.005 g and the amount of distilled water used is 20.0 mL;
    in step "b", the stirring occurs for 20 minutes;
    in step "d", the shaking occurs for 15 minutes;
    in step "e", the compound is transferred to the ultrasound bath for 30 minutes;
    in step "f", the diameter of the hemispherical cavities is 8 mm;
    in step "g", the temperature of the oven is 80° C. and the material is transferred to the oven for 12 hours;
    in step "h", the temperature of the air atmosphere is initially 500° C. and the hemispherical granules are heated for 30 minutes; and
    in step "h", the air atmosphere is raised to 800° C. and the hemispherical granules are heated for an additional 30 minutes.

8. The process of claim 1, wherein calcium oxide is added in step "c".

9. The process of claim 1, wherein magnesium oxide is added in step "c".

10. A method of capturing $CO_2$, comprising the step of providing the CaO-based material or the MgO-based material obtained from the process of claim 1 to capture the $CO_2$.

11. The method of claim 10, wherein the $CO_2$ captured is vehicular $CO_2$ and wherein the CaO-based material or the MgO-based material is coupled to car exhausts to capture the vehicular $CO_2$.

* * * * *